Figure 1:
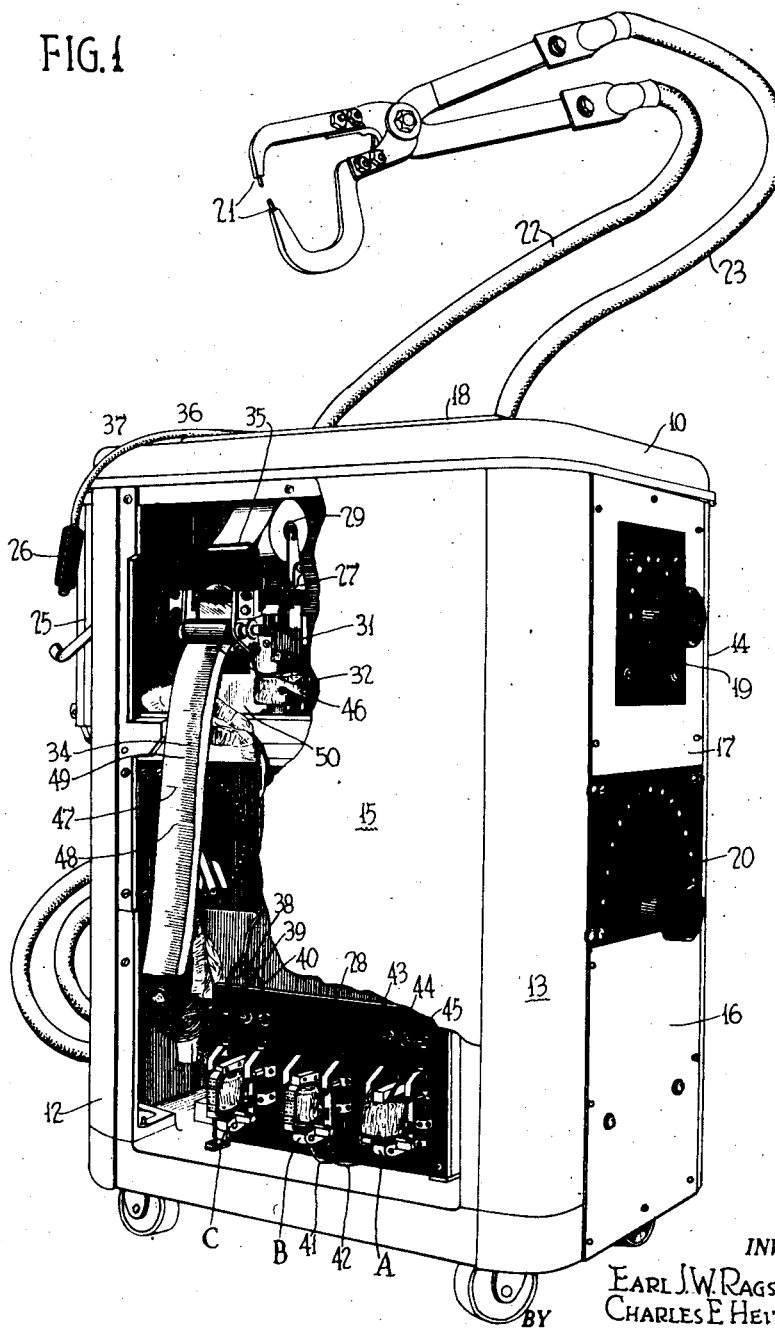

Sept. 21, 1937.  E. J. W. RAGSDALE ET AL  2,093,982
WELD RECORDER
Filed July 7, 1932  5 Sheets—Sheet 1

INVENTOR.
EARL J.W. RAGSDALE &
CHARLES E. HEITMAN, JR.
BY John P. Tarbox
ATTORNEY.

Sept. 21, 1937.  E. J. W. RAGSDALE ET AL  2,093,982
WELD RECORDER
Filed July 7, 1932   5 Sheets-Sheet 3

INVENTOR.
Earl J.W. Ragsdale &
Charles E. Heitman, Jr.
BY
John P. Tarbox
ATTORNEY.

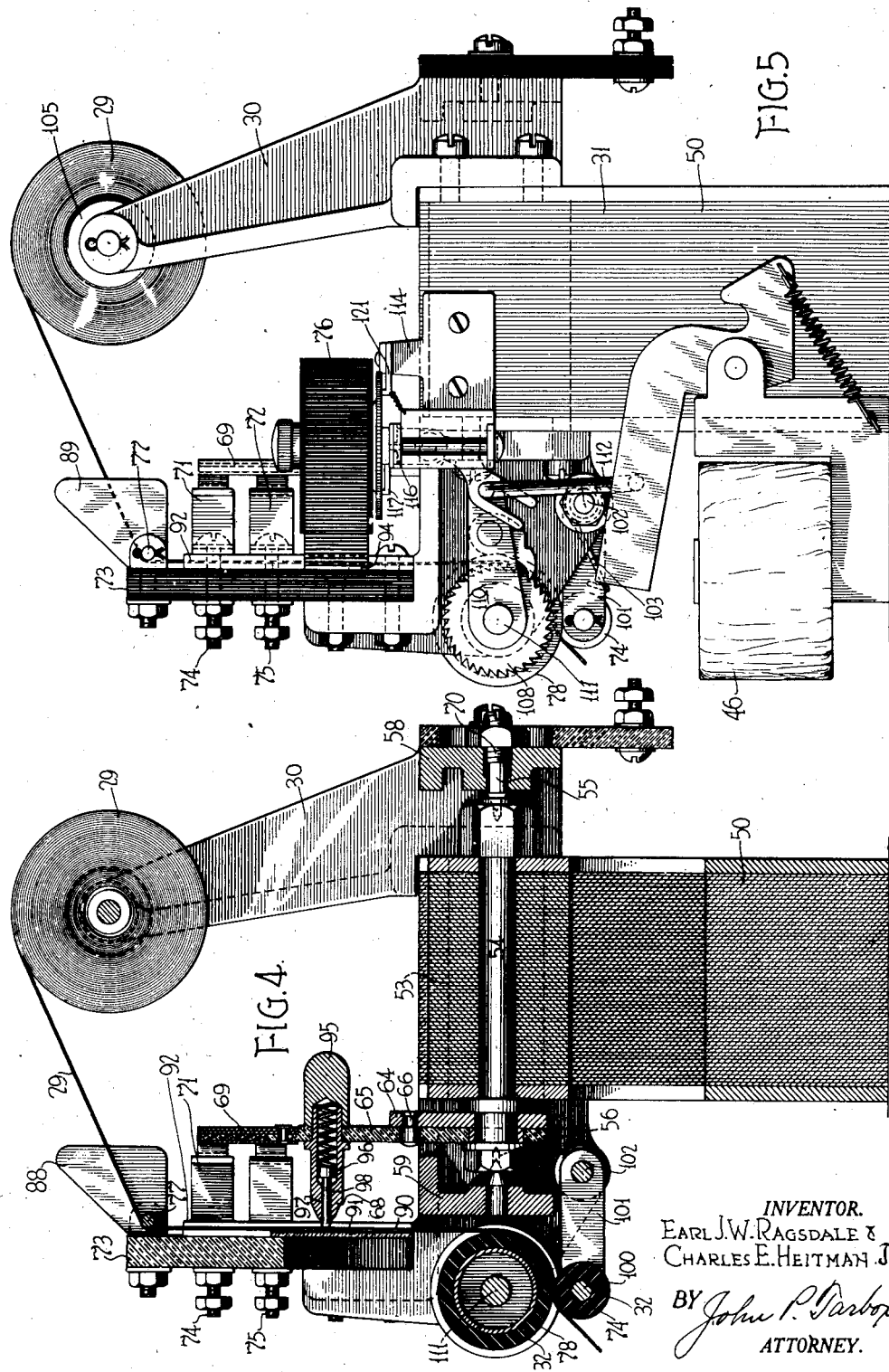

Sept. 21, 1937.   E. J. W. RAGSDALE ET AL   2,093,982
WELD RECORDER
Filed July 7, 1932   5 Sheets-Sheet 5

INVENTOR.
EARL J.W. RAGSDALE &
CHARLES E. HEITMAN, JR.
BY
ATTORNEY.

Patented Sept. 21, 1937

2,093,982

UNITED STATES PATENT OFFICE 2,093,982

WELD RECORDER

Earl J. W. Ragsdale, Norristown, and Charles E. Heitman, Jr., Philadelphia, Pa., assignors to Edward G. Budd Manufacturing Company, Philadelphia, Pa., a corporation of Pennsylvania Application July 7, 1932, Serial No. 621,318

4 Claims. (Cl. 177—311)

This invention relates to welding and more particularly to resistance welding as used in quantity production, commercial processes.

In the fabrication of metallic structures by means of resistance welding, for example by spot welding, a gauge or criterion as to good or poor welds is vitally important. The quantity of energy delivered to a welding circuit is important, but by a proper arrangement of the time duration and in consequence the apparatus used, etc. this may be properly proportioned commensurate with the characteristics of the work pieces to be united. However, as to the energy or welding heat units incorporated in the weld itself thereby controlling the fusion of the parts, many factors must be considered to determine the quality of the resulting weld.

An indicia system or apparatus is needed which will give not only a record of the weld, as to whether it is a good or poor weld, but also the record must be available immediately after the formation of the weld, so that, should a poor weld or a burn occur some means of ascertaining this state or condition of the weld may be readily available at the very time of fabrication of the structure.

Generally, this data is available only a period of time after the completed structure has been made, being secured by the destructive analysis of the structure wherein the individual welds are sectored and micrographic analyses made to determine the effects upon the body of the material. Such methods are, although extremely valuable and vitally important to a proper understanding of the resulting structures, inherently slow and ineffective from a standpoint of knowledge at a time when any poor welds may be effectively corrected.

It is important that some means be available whereby a predeterminate standard for a weld may be set up and all welds subsequently formed, gauged in accordance with said standard to give an indication of the variations therefrom. It is to attain the above desirable features and others incidental thereto that we have constructed the mechanism and system herein disclosed.

This device allows a predetermined standard of weld perfection to be set up and thereafter quantity production of resistance welded metallic structures to be attained with a definite knowledge during the process of construction as to the strength and value of each weld made.

We attain the above enumerated and other desirable objects by constructing a comparative weld efficiency indicator system comprising in combination a welding circuit and means responsive to the energy conditions in said circuit to individually comparatively record the said condition and co-ordinately therewith to indicate variations from predetermined standards.

This invention will be better understood when considered in connection with the accompanying drawings, wherein like ordinals represent corresponding parts in the various figures.

Figure 2:
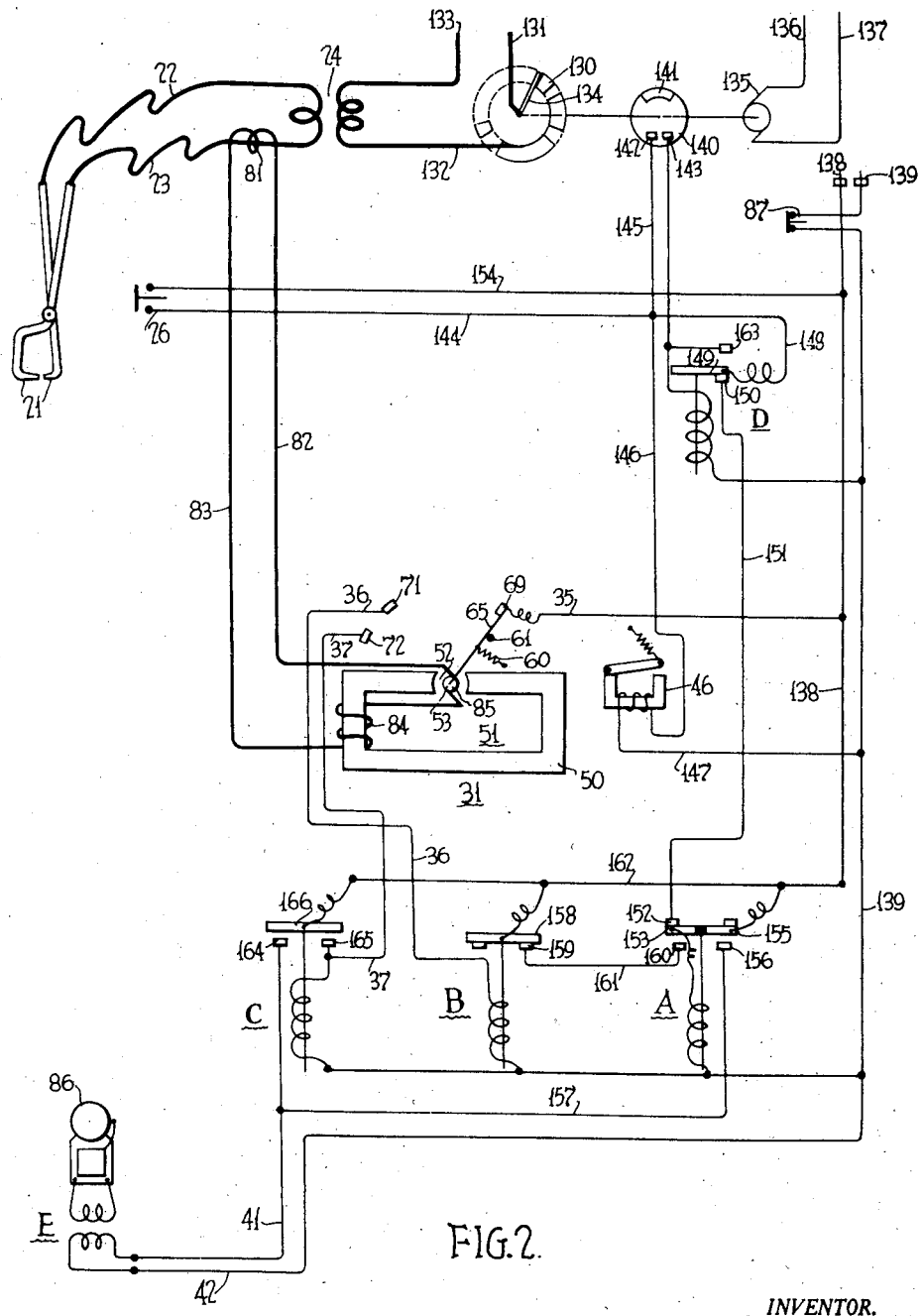
Figure 3:
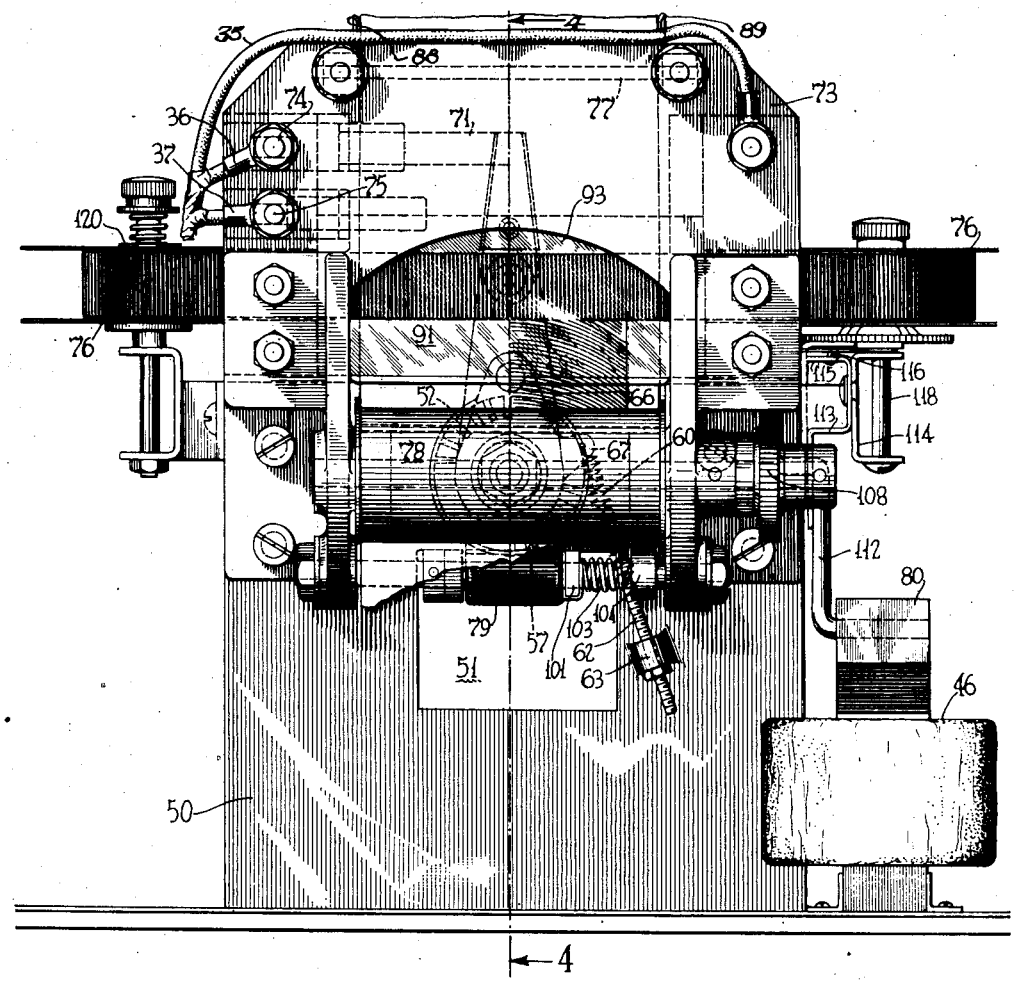
Figure 6:
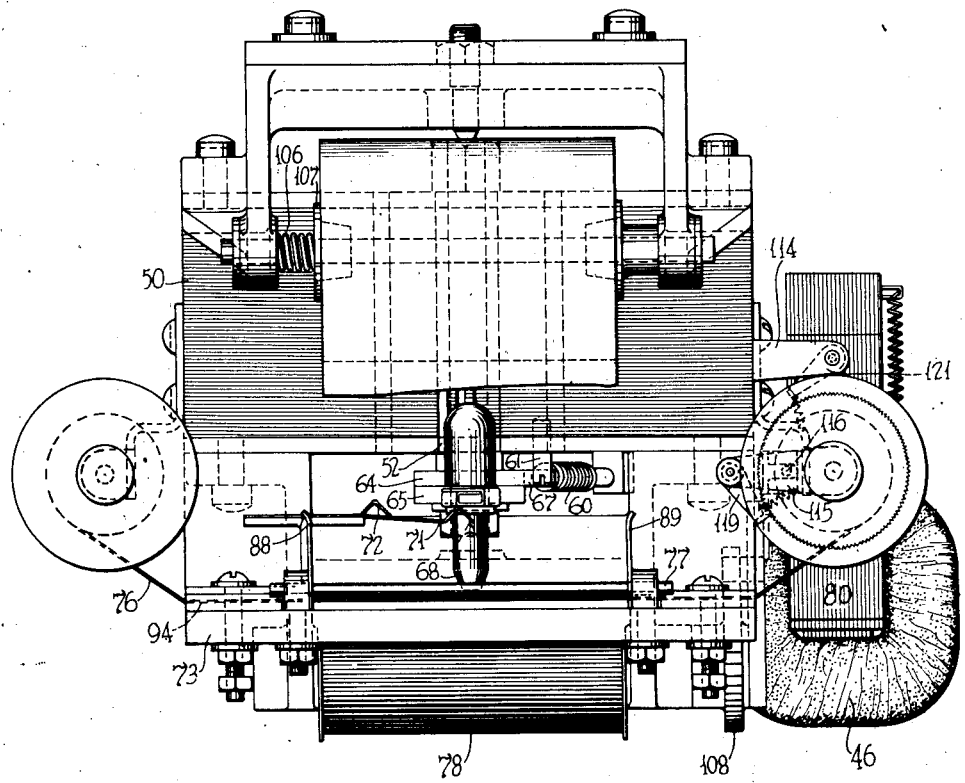

Figure 1 is a perspective showing the device of this invention incorporated in a portable welding unit for which it is most admirably suited, Fig. 2 is a wiring diagram of the system, Fig. 3 is a front elevation of a part of the recorder apparatus, Fig. 4 is a cross section on the line 4—4 of Fig. 3, Fig. 5 is a side elevation of the device, and Fig. 6 is a plan view of the mechanism.

Considering the various views in more detail in Fig. 1 is shown a portable welding apparatus having incorporated therein the desirable features of the present invention. It comprises essentially a framework having upper and lower members 10 and 11 and a plurality of corner posts 12, 13, 14, with the apparatus interiorly thereof and suitably enclosed by panels 15, 16, 17, etc. A top member 18 is hingedly secured to the upper panel for the purpose of ready inspection or replacement of parts. At the right-hand side of the device suitable control panels 19 and 20 are mounted to control the duration and energy of the welding circuit respectively. The welding circuit comprises the electrodes 21 and flexible leads 22 and 23 associated with a secondary of the welding transformer 24. These leads are secured to suitable bus bar terminals which are continuations of the secondary of the welding transformer 24 and extend exteriorly of the panel at the end opposite the end bearing the control panels.

The main power breaker for the energization of the primary side of the transformer is at 25 and is of common commercial construction. A flexible control connection or means comprising possibly a push button 26 is adapted to be used near the electrodes to control the operation of the apparatus and although shown as a separate set of leads, may be incorporated upon the electrodes in some suitable fashion.

The panel 15 closing one side of the portable apparatus is broken away to show the welding recorder as assembled inside the housing. It comprises the recording mechanism 27 and the group of relays 28 marked A, B, and C, associated therewith and a signaling means mounted within the housing, but not shown. The recording mechanism includes a roll of tape 29 mounted by means of suitable brackets 30 above and at the back of a series relay 31 and arranged to feed between the rolls 32 and 33 by means of a friction drive while receiving the record 34 of the consecutive welds as made.

Simultaneously with the actuation of the welding recorder and the impressing upon the record tape 29 of the weld energy index a circuit is completed by the recorder arm through a series of contacts associated with the leads 35, 36, 37. These circuits are transferred to the relays 28 by means of leads 38, 39 and 40. The audible indicating system which may include a bell is actuated as a result of the operation of various relays being energized through the leads 41 and 42. The power supply and electrical interlocking of the relays is obtained through the leads 43, 44 and 45.

The feeding of the record roll 29 is accomplished by means of a step by step motion imparted through the intermediation of the relay 46.

The operation of the apparatus is as follows. The control of the timing and energy value of the welding circuit is set by means of the control panels 19 and 20 and thereafter the electrodes are operated so as to close upon the juxtaposed lapped surfaces of the metal to be united together. As soon as this condition exists the hand operated device 26 is actuated thereby energizing the welding circuit and the various other parts of the apparatus. The relay 46 is actuated affording a step by step or other type of motion to the recording tape and the relay 31 is caused to operate in accordance with the energy condition of the welding circuit thereby forming a record on the tape.

Various interlocks of the mechanism immediately lock out any subsequent operations so that the device cannot be actuated a second time either under a condition of retained or continued operation of the control button 26 or a rapid successive operation thereof, thus insuring an energization of the welding electrode in accordance with the pre-determined positioning of the weld and not due to an accidental pressure upon the control circuit. The individual records on the tape 34 may be readily observed and the condition of the weld ascertained. For instance, the indication at 47 would be indicative of a burn, whereas that at 48 is indicative of a lack of weld energy or in other words no weld at all. The substantially continuous series of indications of the same length as at 49 shows a condition of good weld corresponding to the predetermined standards set up. The previously mentioned variations of burn and under weld are readily apparent as variations from this predetermined standard.

The recording mechanism itself is composed basicly of a series type motor or relay having an arm bearing a stylus and contact member, arranged for co-operation with the tape and fixed contacts respectively and an additional relay in co-operative relation thereto adapted to impart motion to the tape.

This mechanism embodies a stator 50 composed of a plurality of laminations having a central air-gap 51 and a gap 52 of suitable shape for the reception of a rotor 53. The rotor element is likewise built up of laminations as is the stator having a shaft 54 centrally mounted in bearings 55, 56 and thereby adapted for rotating motion within the stator. For the purpose of adjusting for wear and preventing looseness in the rotor the rear bearing 55 is adjustable by means of a screw-threaded arrangement 70 with the bracket. This armature has a plurality of longitudinally or axially extending slots 57 commensurate with the number of armature turns required to set up the proper reactive forces between the stator and rotor. Bearings 55 and 56 are mounted on brackets 58 and 59 which are in turn secured to the stator thus forming a rigid structure preventing the parts from getting out of alignment.

The rotor although capable of continuous rotating movement is for the specific purposes of my device only allowed limited angular motion and is biased in inactive position by means of a spring 60 and limit stop 61. Adjustment of spring 60 is accomplished by means of an adjusting screw 62 secured at one end to the spring and at the opposite end arranged for co-operation with a shoulder 63 which is secured to the outer surface of the stator body. At the forward end of the rotor a plate 64 is rigidly secured and arranged to have mounted upon it the arm 65 of insulating material secured by means of any suitable means such as rivets or a screw-threaded connection 66. The plate 64 is also constructed with an arm 67 which serves the dual function of an abutment for the limit stop and a point of securement for the spring 60. This arm carries a stylus 68 and a contact plate 69, the plate 69 being connected by a flexible connection with the conductor 35.

Appropriately positioned with respect to the arcuate path of travel of the arm 65 are placed the proper number of contact members, in this instance contacts 71 and 72, and which as seen in Fig. 6 are in spaced relation as to the path of arcuate travel, thus giving a contact between the contact plate 69 and the contacts 71 and 72 dependent upon the degree of energization of the series relay which in turn is proportional to the energy of the welding circuit. These contact plates are in turn secured to an insulating panel 73 by means of nut and bolt connections 74 and 75 which at the front side of the panel form contact terminals for the leads 36 and 37.

For purposes of illustration the visual recording system comprises the recording tape 29 and a metallized tape 76. The two are arranged for step by step motion and move at right angles to each other so that there is a common area or intersection of the two said tapes substantially co-extensive both radially and circumferentially of the arcuate path of the stylus. Although these two tapes are shown in this manner, it is quite apparent that by eliminating the last mentioned metallized tape and placing two tapes, one metallized and the other of the plain recording tape type, concentrically rolled upon the same roll, the same results will be achieved as far as permanent record is concerned, while at the same time eliminating some parts of the apparatus shown. Either of these methods of procuring the record are within the scope of the present disclosure and are covered in the appended claims.

The tape is fed through the apparatus and maintained in a definite line of travel by means of an upper roller 77 determining the original point of vertical motion and the lower roller 78 determining the lower limit of vertical motion. The mechanism thus far described furnishes a determinate path of travel for the record tape but does not supply motion for it. This is accomplished by means of an intermittent drive of the roller 78 and a friction grip maintained by a roller 79 which is resiliently held in contact with the roller 78.

The intermittent motion imparted to the metallized ribbon 76 is obtained by means of a ratchet and pawl drive somewhat similar to that of the roll 78. Both of these motions are accomplished from a relay 46, an armature 80 of which is mechanically interlinked with the intermittent feeding of the two tapes. The intermittent feed of the two tapes is controlled in co-ordination with the operation of the welding circuit in such a manner that at each time the welding circuit is energized a new part of the record tape will be in front of the stylus so that a positive and clear impression proportional to the energy of the weld will be obtained. This feed may be step by step and may occur previously to the energization of the welding circuit or subsequently to the energization, the important factor being that a new space on the tape is available at each operation of the welding circuit.

The operation of the apparatus is thus very simple and entails a much more compact construction and a much more accurately controlled motion than is obtained by a solenoid and armature used for the same purpose. Each time the push button 26 is operated to energize the welding circuit the relay 46 is energized giving a predeterminate linear motion to the tape 29 and the ribbon 76. Because of the timing of the duration of the weld these functions all take place in a very small fraction of a second and are complete at the time the welding circuit is energized. The energy of the welding circuit is caused to operate the series relay by means of the current transformer 81 in the electrode circuit and the leads 82 and 83 which in turn are connected to the series connections through the field 84 and armature windings 85 of the series relay. This causes the relay to move in accordance with the energization of the welding circuit and because of the opposition of the motion presented by the spring 60 gives a true criterion of the energy of the welding circuit because of the mass or inertia resistance of the parts to movement and the time duration of the current causing the reactive forces on the rotor. If a good weld is performed the arm 65 will move angularly a predetermined distance and contact 69 will complete a circuit through the contact 71. This will stop the signal system from operating and the record will show a good weld. If, however, an under weld or an incomplete or faulty weld is made the duration of time and amount of current flowing will be proportional thereto and the energization of the rotor will not be sufficient to carry the arm to the contact 71 so that the signal device here represented as a bell 86 will continue to operate thus giving an indication of a defective weld and the operator can look at the chart to see whether the weld is incomplete or whether it has resulted in a burn. Should the situation result in a burn, the energy will be sufficiently great to cause the arm to move to the contact 72 and in this instance although the signaling device will stop by the passage of the arm across contact 71, the signal has been re-energized and caused to operate again by the connection with the contact 72. In this condition the relay C will have been operated closing the signaling circuit and at the same time locking the relay in operative position so that the only means by which the signal can be determined is for the inspector to observe the record of the machine and break the lock-out connection by means of a push button 87. This last mentioned push button is only used in the case of a burn because under those circumstances it is generally necessary that the apparatus be re-set.

With this explanation of the operation a more detailed description of the various parts of the recorder itself will be completed. The tape 29 is caused to feed in a definite path by means of guides 88 and 89 and continues its passage over the roller 77 down through a slot 90 which is formed at one side by a glass plate 91 serving as a window and allowing an immediate inspection of the record at the front and to the rear by a channel formed in the back plate 92. Both the insulating panel 73 and the back plate 92 are centrally discontinuous to provide an arcuate opening 93 so that the stylus can be in contact with the tapes. The ribbon 76 feeds through a slot 94 in either side of the back plate 92 and passes between the glass plate 91 and the record tape 29. The operation of the stylus being to apply a pressure at one side of the ribbon 29 causing an impression on the opposite side, from the metallized tape and the subsequent motion of the tape clearing the ribbon and allowing the record to be visible.

The stylus is composed of two telescoping cylindrical members 95, 96 arranged for a pressed fit cooperation, one of the members passing through the arm 65. The member 96 is drilled to provide a passage 97 so that the stylus member 98, which is of a form similar to a piston and piston rod is yieldably pressed against the recording tape by means of spring 99. This automatically compensates for wear as well as preventing such a possibility as a tearing of the tape.

The roller 79 is rotatably provided on a shaft 100 which in turn is carried by two arms 101 pivotally secured to a shaft 102 and retained in frictional engagement with the roller 78 by means of a spring 103 which is secured rigidly to a collar 104 fastened to the shaft 102 and at its opposite extremity having a radially extending portion bent in such a fashion as to serve for engagement with the arm 101 of the roller carrier, thus maintaining the yielding pressure as to the opposed roller.

A record roll 105 is prevented from large or extensive unrolling at each intermittent feeding by means of a spring 106 and washer 107 serving as a brake. The roll 78 receives its intermittent feed by means of a ratchet and pawl 108, 109 the pawl being carried by an arm 110 which is freely rotatable on shaft 111 and at its opposite extremity is arranged for the reception of a link 112 which is secured to the armature 80 of the relay 46. At each operation of relay 46 the arm is moved downwardly and consequently moving the arm 110, thus feeding the roll one step forward.

The ribbon feed is likewise attained from a connection with the link 112 by means of a bell crank 113 which is pivotally secured to the bracket 114 and at one extremity connects with the link 112 and at its opposite extremity has a bifurcated arm 115 which engages a pin 116 carried in an arm 117 freely rotatable on the shaft 118. The downward movement of the relay armature causes the bell crank to move downwardly below its pivotal point and the upper arm thereof to move forwardly pushing the pin in a forward direction and at the same time causing the pawl 119 carried on the arm to feed the ribbon mechanism forward. This ribbon device is likewise braked to avoid unwinding in a similar fashion to the record roll by means of spring and brake washer 120.

To prevent the back feeding of the ribbon during operation a brake pawl 121 is resiliently maintained in contact with the ratchet wheel of the ribbon feed.

The mechanical construction of the apparatus is seen to incorporate many desirable and novel features giving a compact mechanical structure having motion of great precision and well adapted to determine the departures of each consecutive weld from a predeterminate standard at which the apparatus is set during welding.

The duration of the welding operation is controlled from the panel 19 which in turn controls the number of contact segments 130 which are included in the circuit between the leads 131 and 132. Leads 133 and 131 are connected to a source of power and thereby energize the primary of the welding transformer 34. A rapid make and break connection of the primary circuit is controlled by the arm 134 which is caused to rotate at high speed by the motor 135 which is also connected to a source of power by the leads 136 and 137. Power for the operation of the various relays and control apparatus of the device is secured from a source of energy through the leads 138 and 139.

The voltage and current of the welding circuit are controlled by the panel 20 which is not indicated on the circuit diagram, as such a control is not a part of the present invention. The rotary member 140 having a rotating contact 141 and stationary contacts 142 and 143 serves to determine the lockout of the relays after the completion of the welding.

The control of the entire apparatus after the individual power circuits are closed is accomplished by means of the push button station 26. This switch although the circuit is not shown, controls the power supply to the leads 131 and 133 at a predetermined interval of time after the actuation of the push button. This part of the operation of the apparatus is covered in co-pending applications and is not essential other than for the mere purpose of explaining the coordination of the parts of the apparatus.

The various circuits of the apparatus are energized by power from the leads 138 and 139 and one side of the device is energized from each lead. The lead 139 serves one side of relays 46 and D, one side of the relays A, B and C and one side of the transformer E. The opposite line energizes one side of the push button station, the contact 69 through the lead 35, one side of a double contact in the normally open relay C, one side of the double contact of the normally closed relay B and one side of the normally open contact of the relay A.

When all of the power switches to the apparatus have been closed, the push button 26 is actuated thereby energizing, through the conductors 144 and 145 the fixed contact 142 of the rotating contactor 140 which is a part of the interlock mechanism, the conductor 146 which in cooperation with the conductor 147 completes the circuit to the relay 46. This relay actuates the various record tape and metallized tape as previously described. The circuit from the lead 144 continues through the lead 148 to the movable contact 149 of relay D and thence through fixed contact 150, lead 151 to fixed contact 152 of the relay A. This contact is in engagement with the movable contact 153 which in turn is connected to the one side of the actuating coil of the relay A thereby completing the circuit to the opposite power line 139. This circuit of relay A is as follows, power line 138, lead 154, push button 26, lead 144, lead 148 through contacts 149 and 150, lead 151, contacts 152, 153, actuating coil of relay A to lead 139. In this manner relay A is energized and completes the circuit to the opposite side of the signaling device from the power line 138 to the contacts 155 and 156 and lead 157 and thence to lead 41. At the same time that relay A is actuated the contacts 152 and 153 open while closing the contacts 153 and 160 thereby locking the relay A in operated position through the circuit 161, 162.

The indicator as a result gives an audible signal which may be readily heard by the operator but by this time the welding circuit is energized and the series relay 31 is caused to operate being actuated in accordance with the power of the welding circuit. If this actuation is such as to result from an incomplete weld the contact 69 will not reach the contact 71 and the signaling device will continue to operate. However, if the weld is a normal weld, properly commensurate with the predetermined standards set up in the apparatus by an inspector, the movable contact will complete the circuit through 71 thereby energizing through the lead 36 actuating coil of relay B by means of the following circuit, leads 138, 35, contacts 69, 71, lead 36 of relay coil and lead 139. This actuation of the relay B opens the contacts 158 and 159 thereby breaking the holding or locking circuit of relay A, allowing the same to return to its normal position as shown and breaking the circuit through lead 157 to interrupt the signaling device 86. Under these circumstances the relay A would be re-actuated immediately, but for the relay D which has functioned due to the completion of the circuit through the contacts 141, 142 and 143, which operate the relay D and lock the same in open position, the locking circuit being completed through the contact 163 thereby de-energizing the lead 151.

The described operation of the contacts 69 and 71 is the normal actuation, presenting no deviation from the predetermined standards and resulting in a good weld.

A faulty or under weld corresponds to an actuation of the series relay 31 insufficient to close the contact circuit through the contact 71. If a burn results the contact arm continues to move over and closes the contact 72. In this instance the lead 37 is energized thereby energizing the relay C which in turn closes contacts 164 and 165 by contact 166. In this case the lead 41 is energized causing the signal to recommence and at the same time locking the relay coil in actuated position by means of connection through contact 165, otherwise this relay would have to depend on its circuit through contact 72 which is only closed for a very short period of time. In this instance the relay C is locked in actuated position. To return the apparatus to normal before the welding can be continued it is necessary for an inspector to ascertain the difficulty and reset the apparatus by an actuation of the normally closed push button 87 which de-energizes one side of all of the control circuits thereby giving the previously normal condition prior to a welding operation.

It is readily apparent that the timing of the weld in this apparatus is of appreciably small duration being a small fraction of a second, therefore the functioning of the various parts of the apparatus is considered to take place during the continued actuation of push button 26. The most rapid operation of this push button manually by the operator is of considerably longer time duration than the small fraction of a second during which the welding circuit is energized.

The functioning of the device can now readily be in the following general manner. The apparatus being set for a welding operation the electrodes 21 are closed upon the work parts and push button 26 actuated, causing relay A and relay 46 to be energized, thus putting the tape in proper condition and causing the signaling device to operate. By this time if the weld is formed and is normal the relay B is actuated de-energizing the circuit of the signaling device. The apparatus is now ready for the next operation and push button 26 has been opened. The welding circuit is locked open by the interlock relay D and device 140 as well as locking open the lead 151 which energizes relay A.

Upon the next actuation of the device by closure of push button 26, if no weld is created the signaling device which was initiated upon the closure of the push button continues to ring and an inspector is apprised of the fact that one of many possible factors has entered into the situation, resulting in an unsatisfactory weld. He can thereupon re-set the apparatus or if the controlling factor is external to the apparatus itself it may be corrected. The apparatus is again ready for normal operation and should in this instance the actuation of the push button result in a burn the relay A would have been actuated, the relay B would have been actuated due to closing of contact 71, de-energizing the signal and the arm would have continued over to contact 72 re-energizing the signal device and locking the said signaling device in a condition of continued operation. The inspector must needs consult the chart showing the variations from normal and re-set the apparatus by push button 87 as well as make any other changes necessary.

It is readily apparent that many advantageous features are incorporated in the apparatus herein disclosed and we aim to cover by the hereto appended claims all modifications within the true spirit and scope of this invention.

What we claim is:

1. The combination with an electrical heating circuit of a heat units indicator comprising a series relay connected in series in the heating circuit and arranged for yieldably opposed angular movement responsive to the heat energy of said circuit, switching means to initiate the closure of said heating circuit, indicating means normally energized in response to said initiation of circuit closure, and means controlled by said series relay to de-energize said indicator means upon the occurrence of a pre-determinate energy condition in said circuit.

2. The combination with an electrical heating circuit of a heat units indicator comprising a series relay connected in series in the heating circuit and arranged for yieldably opposed oscillatory motion responsive to the heat energy of said circuit, switching means to initiate the closure of said heating circuit, indicating means normally energized in response to said initiation of circuit closure, and means controlled by said series relay to de-energize said indicator means upon the occurrence of a pre-determined energy condition in said circuit, and means responsive to a predetermined different actuation of said series relay to re-energize said indicator.

3. The combination with an electrical heating circuit of a heat units indicator comprising a series relay connected in series in the heating circuit and arranged for yieldably opposed oscillatory motion responsive to the heat energy of said circuit, switching means to initiate the closure of said heating circuit, indicating means normally energized in response to said initiation of circuit closure, and means controlled by said series relay to de-energize said indicator means upon the occurrence of a pre-determined energy condition in said circuit, and means responsive to a predetermined actuation of said series relay to re-energize said indicator, and to lock said indicator mechanism in energized condition.

4. The combination with an electrical heating circuit, of an electrical heat-units responsive means operatively connected with the heating circuit so as to respond proportionately to the heat units consumed therein, switching means for initiating the closure of said heating circuit, and electrical signal means normally energized in response to said initiation of circuit closure, said heat-units responsive means including means to deenergize said signal means upon the occurrence of a predetermined consumption of heat-units by said heating circuit.

EARL J. W. RAGSDALE.
CHARLES E. HEITMAN, Jr.